United States Patent
Cederstrand et al.

[11] 3,911,277
[45] Oct. 7, 1975

[54] DUAL LIGHTHOUSE DETECTOR

[75] Inventors: Carl N. Cederstrand, Brea; Charles A. Keenan, Irvine, both of Calif.

[73] Assignee: Beckman Instruments, Inc., Fullerton, Calif.

[22] Filed: July 25, 1974

[21] Appl. No.: 491,672

[52] U.S. Cl. ............. 250/345; 250/343; 250/344; 73/355 R
[51] Int. Cl.² ........................................ G01N 21/34
[58] Field of Search ........... 250/338, 344, 345, 346; 73/355 R

[56] References Cited
UNITED STATES PATENTS

| | | | |
|---|---|---|---|
| 2,718,597 | 9/1955 | Heigl et al. | 250/346 |
| 3,056,106 | 9/1962 | Hendricks | 250/338 |
| 3,303,340 | 2/1967 | Hewett et al. | 73/355 R |
| 3,562,522 | 2/1971 | Cederstrand | 250/343 |
| 3,610,931 | 10/1971 | Woolfson | 250/338 |
| 3,632,212 | 1/1972 | Bernal | 250/343 |
| 3,677,652 | 7/1972 | Little | 250/339 |
| 3,678,269 | 7/1972 | Malek | 250/343 |

*Primary Examiner*—James W. Lawrence
*Assistant Examiner*—B. C. Anderson
*Attorney, Agent, or Firm*—R. J. Stienmeyer; P. R. Harder

[57] ABSTRACT

A sensor unit is provided for selective detection of one or another of gaseous pollutants by response to absorption of infrared radiation by the pollutant to be detected. The unit contains a pair of thermistor elements mounted back to back in a housing having two opposite windows, in each of which filters are mounted. These filters are selective for the different radiation absorption characteristics of two different gaseous pollutants such as carbon monoxide and hydrocarbons. Each thermistor is behind a different filter. The unit is rotatable to expose one filter window or the other to radiation passing through the sample containing the pollutant to be measured. A shield is provided to shade the filter window which is not to be exposed to radiation.

8 Claims, 5 Drawing Figures

DUAL LIGHTHOUSE DETECTOR

BACKGROUND OF THE INVENTION

Nondispersive infrared absorption-type analyzers for gaseous pollutants in air have been described as having a sample gas to be analyzed, a flow cell for the sample, a detector and a filter having a filter characteristic appropriate to the gaseous pollutant to be analyzed. One such analyzer is described in U.S. Pat. No. 3,562,522 issued to Cederstrand et al. Arrangements have also been described for compensating for variations in ambient temperature by utilizing a sensor such as a thermistor having two differentially connected portions, one of which is exposed to the radiation to be measured and the other is shielded so as to be affected only by ambient temperature. Compensation arrangements are described in various U.S. Patents, such as 3,678,269 Malek; 3,610,931 Woolfson; Reissue 24,983 Gallagher et al.; 3,056,106 Hendricks et al. and 3,433,953 Sweet et al.

An ambient temperature compensated, thermistor type, infrared detector is described also in U.S. Pat. No. 3,303,340 Hewett et al. in which two thermistor portions are mounted in a light tight housing with a window opening upon only one of the thermistor portions whereby the other is affected only by variations in ambient temperature. When thermistor infrared detectors are employed for analysis of air with respect to a particular pollutant, it is necessary to provide an appropriate infrared filter means in the optical path so that the instrument will respond only to the desired wavelengths of infrared. This necessitates the replacement of the filter portion of the apparatus when a different pollutant is to be detected or the utilization of more than one analyzer, each selectively responsive to a different wavelength and hence a different gaseous pollutant.

It is accordingly an object of the invention to provide an inexpensive analysis apparatus which may easily be switched over for the selective analysis of one pollutant or another.

Other and further objects, features and advantages of the invention will become apparent as the description proceeds.

SUMMARY OF THE INVENTION

In carrying out the invention in accordance with a preferred form thereof, a detector unit is employed having interchangeable ambient temperature compensating and radiation detecting thermistor flakes therein mounted in a holder having two angularly spaced windows. Each window opens upon one thermistor flake and the holder is rotatable so that radiation may enter through one window or the other. Each window contains a filter having transmission characteristics appropriate to the polluting gaseous constituent to be detected when the sensor holder is in a given angular position. The apparatus is used in conjunction with a gas cell mounted between the source of radiant energy and a focusing mirror designed to focus the transmitted radiant energy upon the sensor unit. The filter window which is in use is then the window which is toward the focusing mirror. A shield is provided on the opposite side of the rotatable mounting to shield the other filter window from directly transmitted radiation and from any stray radiation reflected from other surfaces within the apparatus.

A better understanding of the invention will be afforded by the following detailed description considered in conjunction with the accompanying drawings.

DRAWINGS

Figure 4:
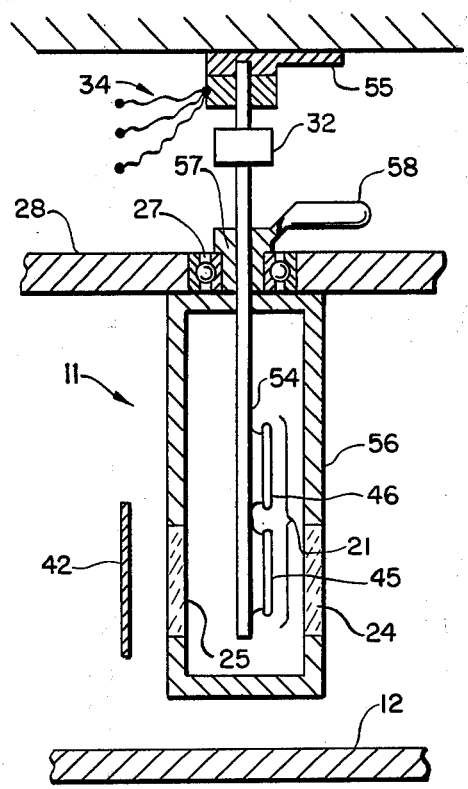
Figure 5:
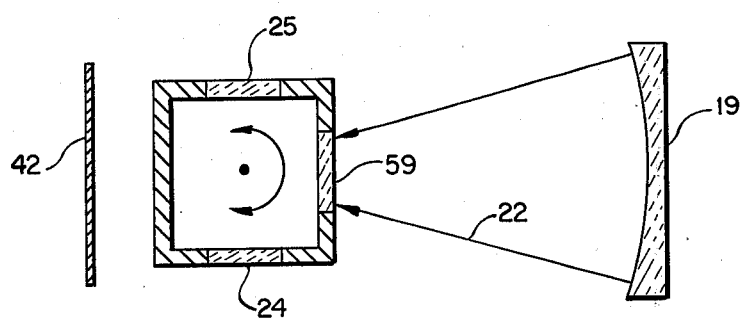

FIG. 4 is a fragmentary vertical cross section of a modified embodiment of the apparatus representing a mechanical arrangement for switching from one selective analysis position to another for use when two different pollutants are to be selectively detected; and FIG. 5 is a fragmentary schematic diagram representing a horizontal section of another embodiment of the invention for use when more than two different pollutants are to be detected selectively.

Like reference characters are utilized throughout the drawings to designate the like parts.

DETAILED DESCRIPTION

Figure 1:
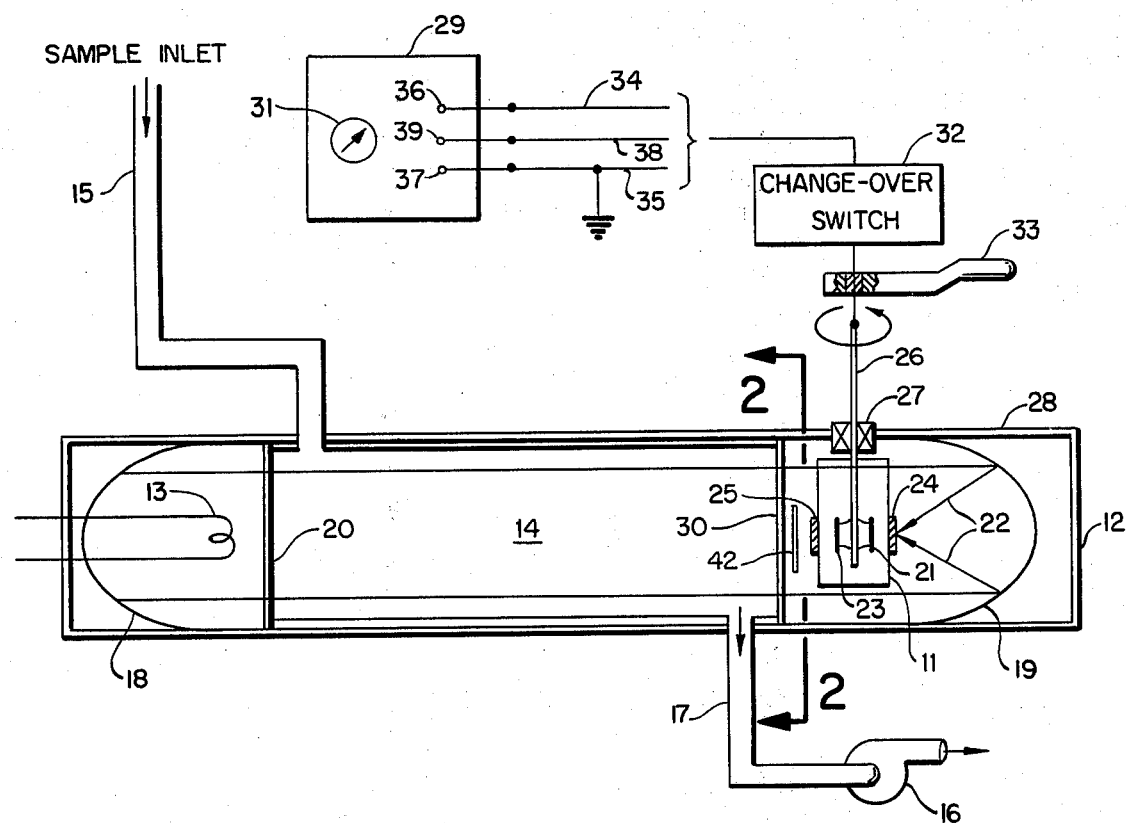
FIG. 1 is a schematic diagram partially in vertical section illustrating an embodiment of the invention for selective measurement of two different gaseous pollutants.

In the embodiment of the invention illustrated in FIG. 1, a selectively positionable rotatable sensor unit 11 is mounted in a light tight box 12 together with a pulsed infrared radiation source such as a filament 13 mounted in a hermetically evacuated chamber and operated at a relatively low voltage and temperature with an interposed gas cell 14. Pulsing may be accomplished in any suitable manner, such as by means of a revolving chopper (not shown) or by applying a pulsed voltage to the filament. The gas cell is of a conventional type adapted to receive air or gases containing pollutants such as internal combustion engine exhaust through an intake pipe 15 with continuous flow of the analyzed gases being maintained by an exhaust pump or fan 16 connected through a discharge pipe 17 of the gas cell 14. Preferably, a parabolic mirror 18 and a spherical or parabolic mirror 19 are provided. The parts are so positioned that infrared rays from the source 13, brought into parallel paths by the mirror 18 and passing through the gas cell 14, are focused by the mirror 19 upon a sensor 21 in the unit 11, the infrared rays having been caused to travel along converging light paths 22.

The gas cell 14 is provided with windows 20 and 30 which are transparent to infrared radiation. For example, sapphire may be employed.

In order that the apparatus may readily be changed in operation from response to measurement of one pollutant to measurement of another, one or more additional sensing elements, such as an element 23, are provided with means for selectively exposing one sensor element 21 or the alternate sensor element 23 to the radiation beams 22 through one or the other of two windows, each containing a filter 24 or a filter 25. One filter 24 has transmission characteristics suitable for the detection of one gaseous pollutant and the other filter 25 has transmission characteristics appropriate for a different pollutant.

The construction is such that either the filter 24 or the filter 25 is in use, one or the other being selected by appropriate positioning of the unit 11. In the embodiment of FIG. 1 this is accomplished by mounting the unit 11 upon a rotatable shaft 26 journaled in a bearing 27 mounted in the top wall 28 of the box or casing 12. Suitable electrical detection, amplification and indicating apparatus are provided represented schematically in FIG. 1 by a rectangle 29 containing conventional electronic circuitry and an indicating device, which may take the form of a deflecting-pointer instrument, or a curve-drawing instrument 31.

Figure 3:
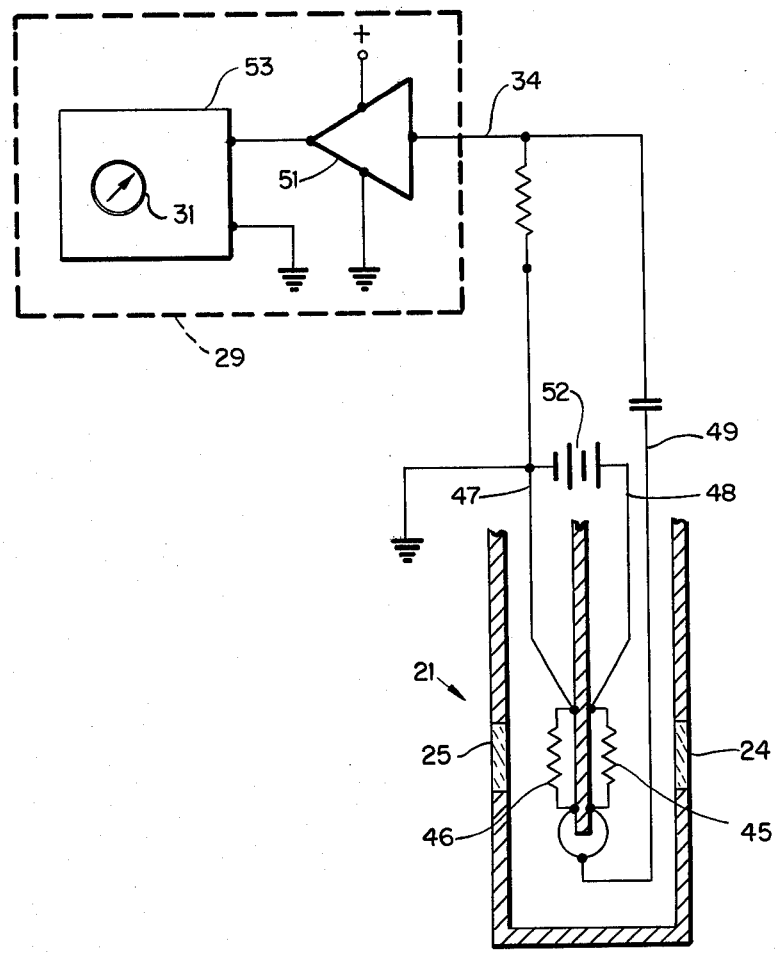
FIG. 3 is a fragmentary view of the dual compensated infrared sensor element, shown together with the filter, surrounding wall of a sensor mounting unit, and with electrical circuitry.

In practice, the shaft 26 may be made hollow or provided with longitudinal passages for flexible leads 34, 35 and 38, shown fragmentarily in FIG. 1 for connecting the sensors 21 and 23 to the electrical unit 29. Leads 34 and 35 from the sensor 24 are connected to input terminals 36 and 37. Similarly leads 38 and 35 are connected to input terminals 39 and 37, the elements 35 and 37 being at ground potential. The arrangement of FIGS. 1 and 3 is such that the rotatable unit 11 has two positions 180° apart for producing a response to one pollutant or another, such as carbon monoxide in one position and hydrocarbons in the other position, for example.

For simplicity in the drawing, electrical circuits are not shown in detail. Preferably a single amplifier is utilized with suitable switches 32 for transferring gain and zero settings appropriate for each channel in accordance with the angular position of the shaft 26, carrying a handle 33 mechanically connected to the shaft 26 and the switch 32.

In the arrangement illustrated the radiation from the source 13 is reflected back upon whichever sensor 21 or 23 is exposed to the rays reflected from the mirror 19.

Figure 2:
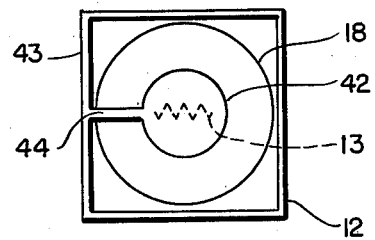
FIG. 2 is a view of a cross section of the apparatus of FIG. 1 represented as cut by a plane 2—2.

The apparatus is arranged to prevent the radiation from passing through the filter window 25 and falling upon the sensor 23 when the sensor 21 is in position to receive radiation through the filter window 24 from the rays 22, and vice versa. This is accomplished in the arrangement of FIGS. 1 and 2 by providing a screen or shield 42 so mounted as to shade the filter window of the unit 11 which is toward the source 13 and the focusing mirror 18. As shown in FIG. 2, the shield 42 may consist of an opaque disc secured to a wall of the casing 12, for example a sidewall 43, by means of a bracket 44. In this manner, the sensor behind the opaque shield automatically serves as the temperature compensating element.

The invention is not limited to the use of a specific form of radiation responsive sensor. However, a satisfactory result has been obtained by the use of ambient temperature compensated thermistors having two portions or flakes 45 and 46 as illustrated in FIG. 3 serially connected with end terminals connected to conductors 47 and 48, respectively, and to a current source 52 and with a common terminal connected to a conductor 49. As shown in FIG. 3, the filter window 24 is large enough to permit radiation to fall only upon the thermistor portion 45. The portion 46 is shaded in the angular position shown in FIG. 3 so that the portion 45 is affected both by the radiation received through the filter window 24 and ambient temperature, whereas the portion 46 is affected only by the ambient temperature. In the opposite angular position, the flake 46 receives radiation through the filter window 46 and the flake 45 is shaded.

The unit 29 has suitable internal elements, represented schematically as including an operational amplifier 51 with an additional stage 53, for example. In the arrangement represented by FIG. 1, separate sensors 21 and 23 have been provided for the detection and measurement of two different pollutants. However, the invention is not limited to this arrangement and if desired, as illustrated in FIG. 4, a single sensor 21 may be provided which is mounted upon a stationary shaft or rod 54 extending through the top wall 28 of the casing 12 and secured to a stationary bracket 55 attached to a suitable support, which may be secured by means not shown to the casing 12. In this embodiment the unit 11, comprising flakes 45 and 46, is provided with a rotatable cylinder 56 surrounding the rod 54 and the single sensor 21. The cylinder 56 contains oppositely disposed filter windows 24 and 25 and is supported by a hollow shaft 57 journaled in the bearing 27 and surrounding the stationary rod 54 with a suitable operating handle 58 secured to the hollow shaft 57. Change-over contacts are provided for the different zero and gain setting required for each channel.

If it is desired to provide a detector or analyzer responsive to more than two different constituents, this may be accomplished by providing the sensor holder 11 of FIG. 1 or the rotating cylinder 56 of FIG. 4, not only with the filter windows 24 and 25 but one or more additional filter windows, such as a filter window 59 shown in FIG. 5 with the filter windows spaced around the axis of the unit.

Although we have herein shown and described our invention in what we have construed to be the most practical and preferred embodiments, it is recognized that departures may be made therefrom within the scope of our invention, which is not limited to the details disclosed herein but is to be accorded the full scope of the claims so as to embrace any and all equivalent structures, methods and devices.

What is claimed is:

1. An analyzer for selective detection of a molecular constituent in a sample by determination of absorption of radiant energy passed through the sample, said unit comprising in combination:

a radiant energy source, a sensor element means responsive to radiation and connected to the analyzer, a sample cell mounted in the path between the source and the sensor element means, the cell having windows which are transparent to radiation of interest from the source, a movable mounting comprising light impervious walls with windows therein, said sensor element means being positioned behind said walls with respect to the radiant energy, and a filter in each window effective for filtering radiant energy of different wavelengths characteristic to the constituent to be detected, said mounting being arranged to expose only one of said windows to radiation in a selected position thereof, and to expose only another one of said windows in another position thereof, said mounting is rotatable with windows at different angular positions and with the sensor element means within the walls of the mounting, and means are provided to orient the mounting in a given direction toward the radiant energy whereby the angular position of the mounting determines which window receives the radiation.

2. A combination as defined in claim 1 wherein the mounting walls surround the sensor element means with filter windows positioned oppositely with respect to the sensor element means, whereby for a given angular position of the mounting one filter window is in front with respect to the direction from which radiation is received and the other is behind to cause only the front filter window to be directly exposed to radiation.

3. A combination as defined in claim 2 wherein a radiation shield is mounted behind the rotatable mounting whereby it shades the rear filter window from undesired radiation.

4. A combination as defined in claim 3 wherein infrared radiation is employed and the sensor element means constitutes thermistor means.

5. A combination as defined in claim 1 wherein the sensor element means is provided with a stationary support and the mounting walls are rotatable with respect thereto for exposing the sensor element means through one or another of the several filter windows.

6. A combination as defined in claim 4 wherein the thermistor means comprises a pair of thermistors with one filter window opening upon one thermistor and the other filter window opening upon the other thermistor.

7. A combination as defined in claim 6 wherein the thermistors are of the dual type each with a pair of differentially connected portions, one being a dark flake and the other being a light flake, with the filter window opening upon only one of such thermistor portions, whereby one thermistor portion is affected by both radiation and ambient temperature and the other thermistor portion is affected by ambient temperature only, so that compensation is provided for variations in ambient temperature.

8. A combination as defined in claim 5 wherein the sensor element means comprises a light thermistor flake and a dark thermistor flake which interchange their functions upon rotating the mounting.

* * * * *